(12) United States Patent
Zhong et al.

(10) Patent No.: US 6,500,235 B2
(45) Date of Patent: Dec. 31, 2002

(54) PRESSURE SWING ADSORPTION PROCESS FOR HIGH RECOVERY OF HIGH PURITY GAS

(75) Inventors: Guoming Zhong, Getzville, NY (US); Mohamed Safdar Allie Baksh, Amherst, NY (US); Frank Notaro, Amherst, NY (US); Frederick Wells Leavitt, Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/750,083

(22) Filed: Dec. 29, 2000

(65) Prior Publication Data

US 2002/0134240 A1 Sep. 26, 2002

(51) Int. Cl.$^7$ ............................................. B01D 53/047
(52) U.S. Cl. .............................. 95/98; 95/100; 95/103; 95/105; 95/130; 95/138; 96/130; 96/143
(58) Field of Search ..................... 95/96–98, 100–105, 95/130, 138, 902; 96/108, 130, 143, 144

(56) References Cited

U.S. PATENT DOCUMENTS

| | | | | |
|---|---|---|---|---|
| 3,928,004 A | * | 12/1975 | Bligh et al. ............... | 95/138 X |
| 3,996,028 A | * | 12/1976 | Golovko et al. ............... | 95/103 |
| 4,011,065 A | * | 3/1977 | Munzner et al. ............ | 95/138 X |
| 4,239,509 A | * | 12/1980 | Bligh et al. ............... | 95/138 X |
| 4,359,328 A | | 11/1982 | Wilson ............................ | 55/26 |
| 4,448,592 A | * | 5/1984 | Linde ........................ | 95/138 X |
| 4,477,265 A | | 10/1984 | Kumar et al. .................... | 55/26 |
| 4,732,580 A | * | 3/1988 | Jain et al. ................... | 95/138 X |
| 4,859,217 A | * | 8/1989 | Chao ............................... | 55/68 |
| 5,085,674 A | | 2/1992 | Leavitt .......................... | 55/26 |
| 5,106,399 A | * | 4/1992 | Fisher ....................... | 95/138 X |
| 5,125,934 A | * | 6/1992 | Krishnamurthy et al. ..... | 95/101 |
| 5,137,549 A | * | 8/1992 | Stanford et al. .......... | 95/138 X |
| 5,294,418 A | * | 3/1994 | Ramprasad et al. ........ | 423/219 |
| 5,382,280 A | * | 1/1995 | Choe et al. ................ | 95/138 X |
| 5,395,427 A | | 3/1995 | Kumar et al. .................. | 95/101 |
| 5,440,884 A | | 8/1995 | Bonaquist et al. ............. | 62/22 |
| 5,520,720 A | * | 5/1996 | Lemcoff ..................... | 95/130 X |
| 5,529,610 A | * | 6/1996 | Watson et al. ............. | 95/130 X |
| 5,547,492 A | * | 8/1996 | Cho et al. ...................... | 95/100 |
| 5,601,634 A | | 2/1997 | Jain et al. ..................... | 95/114 |
| 5,730,003 A | | 3/1998 | Nguyen et al. ............... | 62/648 |
| 5,738,709 A | | 4/1998 | Lee et al. ....................... | 95/98 |
| 5,783,162 A | | 7/1998 | Tomita et al. .............. | 423/348 |
| 5,871,565 A | * | 2/1999 | Leavitt ..................... | 95/138 X |
| 5,945,079 A | * | 8/1999 | Mullhaupt et al. .......... | 423/219 |
| 6,083,301 A | * | 7/2000 | Gary et al. ................ | 95/138 X |

FOREIGN PATENT DOCUMENTS

| | | |
|---|---|---|
| AU | A-47537/93 | 4/1994 |
| GB | 2174922 A | 11/1986 |

OTHER PUBLICATIONS

D. Diagne et al., Ind. Eng. Chem. Res. vol. 34, 3083–3089 (1995).
D. Diagne et al., J. Chem. Eng. of Japan, vol. 27, No. 1, 85–89 (1994).
D. Diagne et al., J. Chem. Tech. Biotechnol, vol. 65, 29–38 (1996).

* cited by examiner

*Primary Examiner*—Robert H. Spitzer
(74) *Attorney, Agent, or Firm*—Robert J. Follett (57) ABSTRACT

An improved pressure swing adsorption process and system for producing a high recovery of a highly purified product gas, such as argon, from a feed gas stream containing the product gas and impurity gases employs first and second adsorption stages with beds for adsorbing impurity gases. The system and process provides for sequential steps of: feed pressurization; simultaneous feed pressurization and product pressurization; adsorption; adsorption and purge; adsorption in the absence of purge; pressure equalization between beds; evacuation and depressurization of adsorbent bed; evacuation with product purge; evacuation without purge; and pressure equalization between beds.

17 Claims, 5 Drawing Sheets

PRESSURE SWING ADSORPTION PROCESS FOR HIGH RECOVERY OF HIGH PURITY GAS

FIELD OF THE INVENTION

The present invention provides an improved pressure swing adsorption (PSA) process capable of delivering high purity and high recovery of a high purity gas, such as argon, from a feed stream. More specifically, the present invention provides an improved process with high recovery for purification of crude argon available from a cryogenic air separation unit. The high recovery enables the present invention to become a complete process without any additional requirement for purification and recycle back to the cryogenic air separation unit.

BACKGROUND OF THE INVENTION

Currently, oxygen and nitrogen, the two main products of an air separation, can be directly removed from a two-stage cryogenic rectification unit involving a high pressure column and a low pressure column. Argon, which constitutes almost 1% of the feed air, is then enriched in the middle section of the low pressure column. This enriched argon containing about 10 to 12% of argon, 0.1% of nitrogen and the rest of oxygen is fed to the argon low ratio column to produce crude argon containing impurities of about 1 to 5% of oxygen and 1 to 3% of nitrogen. Crude argon is then purified to about 99.999% purity, typically first by catalytic deoxygenation or by a superstaged argon column to remove oxygen, then by rectification in a high ratio column to remove nitrogen.

Catalytic deoxygenation requires the availability of hydrogen, which is not always available and cost effective everywhere in the world. Hydrogen reacts with oxygen to form water, which is then removed from crude argon. Superstaging is another alternative for oxygen removal by adding additional separation stages in the argon column. However, the number of these additional stages could be fairly large, for example, between 115 to about 140, because of the small difference in the relative volatility between oxygen and argon. Furthermore, a high ratio cryogenic column will still be required for additional nitrogen removal if nitrogen is present in the crude argon column.

As compared to the above conventional very elaborate methods of recovering 80 to about 90% argon from air, a PSA process provides a simple and effective alternative for argon purification and recovery. No hydrogen or additional cryogenic stages are required. However, conventional PSA processes suffer from a rather low argon recovery of about 40%. Thus, it is necessary to recycle the PSA waste stream, still containing significant amount of argon, back to the cryogenic air separation unit for additional recovery. Consequently, PSA is much less attractive.

High purity argon is generally produced by purifying crude argon available from an air separation unit. Adsorption is a promising alternative to cryogenic superstaging as disclosed by Bonaquist and Lockett in U.S. Pat. No. 5,440,884 and catalytic deoxygenation as disclosed by Tomita et al. in U.S. Pat. No. 5,783,162.

Jain and Stern in U.S. Pat. No. 5,601,634 and Jain and Andrecovich in AU-A-47537/93 disclose respective cryogenic temperature swing adsorption purification processes. In AU-A-47537/93, the cryogenic TSA is carried out below 150 K in a two layer adsorbent bed. The first layer comprises one or more equilibrium selective adsorbents, such as calcium exchanged type X and A zeolite to preferentially adsorb nitrogen over argon. The second layer comprises one or more rate selective adsorbents, such as CMS and 4A type zeolite, to preferentially adsorb oxygen. Upon completion of adsorption, the bed is regenerated by passing a warm purge gas substantially free of impurities, such as nitrogen and oxygen. This prior art involves low temperature adsorption and argon recycle.

U.S. Pat. No. 5,601,634 discloses a cryogenic TSA process with a liquid-vapor two phase feed. The adsorption bed contains one or more adsorbents selective for nitrogen and/or oxygen at a temperature between the bubble and dew point of the two phase mixture. The advantage of this two phase feed is that any increase in temperature during the adsorption step will evaporate some of the liquid and that the heat of adsorption is offset. This can improve the adsorption capacity. However, because of low operating temperature and the warm purge required, this process is energy relatively intensive.

Nguyen et al. in U.S. Pat. No. 5,730,003, teaches a PSA process for crude argon purification. The process uses oxygen rate or equilibrium selective adsorbent for oxygen removal. In Nguyen et al., the $O_2$ rate selective adsorbents include CMS, clinoptilolite, type A zeolite, and the $O_2$ equilibrium selective adsorbents include adsorbents disclosed by Ramprasad et al. in U.S. Pat. No. 5,294,418. A layer of nitrogen equilibrium selective adsorbent such as CaA and type X zeolite is mentioned for nitrogen removal. The process uses the following cycle steps: feed pressurization, adsorption, cocurrent depressurization, countercurrent blowdown, countercurrent purging and product pressurization. This process does not require low temperature as required by a TSA. However, the argon recovery is low (about 40%) and recycling of desorption gas, during bed regeneration, back to the cryogenic air separation plant is necessary to enhanced argon recovery. This prior art uses a Simplex two bed PSA system.

Kumar et al. in U.S. Pat. No. 4,477,265, discloses a two stage PSA process for argon purification. The two layers of adsorbents for oxygen and nitrogen removal are in two separated stages. The two stages are connected in series. This allows the process to be more flexible, for example, it permits possible bed interactions even within a stage and using different number of beds in different stages. In one preferred embodiment, three beds are in fact used in the first stage for nitrogen removal using a nitrogen equilibrium selective adsorbent. Two beds are in the second stage for oxygen removal using an oxygen rate selective adsorbent. The basic cycle steps include adsorption, evacuation and pressurization. Also, argon recovery is low, and recycling the waste stream, still containing considerable amount of argon, back to cryogenic unit is necessary for additional recovery. In addition, recycling of PSA waste stream back to the cryogenic plant makes the air separation unit more complex and a PSA option less attractive.

Also, Kumar et al. in U.S. Pat. No. 5,395,427 discloses a two stage PSA process using oxygen and nitrogen equilibrium selective adsorbents for producing high purity oxygen from air. The oxygen equilibrium selective adsorbent is a cobalt-based material and preferably used in the second stage. Carbon dioxide, water and nitrogen are preferably removed in the first stage filled with one or more adsorbents selective for the impurities. Oxygen is desorbed from the second stage as product, and the effluent is used to regenerate the first stage adsorbent(s).

Wilson, U.S. Pat. No. 4,359,328, discloses an inverted PSA process, in which a strong component is adsorbed at low pressure while a weak component is adsorbed at high pressure. This is just opposite to conventional PSA process and could be used to recover strong component with enhanced purity.

Lee and Paul, U.S. Pat. No. 5,738,709, discloses a nitrogen PSA process with an intermediate pressure transfer. Instead of a conventional end-to-end (bottom, top or both) transfer, a transfer is carried out from an intermediate point of the high pressure bed to a point close to the feed end of the low pressure bed. Such a transfer increases the productivity and recovery of nitrogen.

Leavitt, U.S. Pat. No. 5,085,674, discloses a Duplex PSA process. The setup is similar to a two stage PSA but with two distinguished features: intermediate feed between the two stages rather than at one end (top or bottom) and recycling capability from the low pressure bed to the high pressure bed. Such a process combines both the conventional PSA and the inverted PSA features of U.S. Pat. No. 4,359,328, and could provide high purity and also recovery. However, this process has not been applied to argon purification with removal of both oxygen and nitrogen. In addition, the process does not advantageously use the capability of the system, e.g., intermediate pressure transfer.

Diagne et al, J. Chem. Eng. Japan, 27, 85 (1994), Ind. Eng. Chem. Res., 34, 3089 (1995), J. Chem. Tech. Biotechnol. 65, 29 (1996), discloses a Duplex process for carbon dioxide removal and enrichment from air-carbon dioxide mixtures. It simultaneously concentrates and removes carbon dioxide beyond the factor of pressure ratio between adsorption and desorption, a limit for the conventional PSA.

Garrett, U.K. Patent No. 2,174,922 A, discloses a fast cycle PSA system for separating a gas feed mixture into two gas streams. The system is close to the Duplex and also has intermediate feed and bottom recycle features. However, the process focuses on fractional pressure change for thermodynamic efficiency and short cycle time. This consequently limits the purity in the separation process. Therefore, it could not be applied to purification where high purity is required as in the instant invention.

The non-PSA processes, i.e., superstaged cryogenic distillation and catalytic deoxygenation, in the prior art of crude argon purification require a large number of cryogenic stages or the availability of hydrogen. In addition, they normally require some recycling between argon purification unit (argon column or deoxygenation system) to the main air separation unit and further residual nitrogen removal. Therefore, the entire hybrid plant from air separation to argon purification becomes very complex, less flexible and less attractive.

On the other hand, conventional PSA processes in the prior art could provide high argon purity, but the recovery is limited. So, a recycling from PSA back to the air separation unit is normally required for additional argon recovery. This in turn makes PSA integration more difficult and less flexible.

The Duplex process of Leavitt in U.S. Patent No. 5,085,674 is able to provide both high purity and recovery by using an intermediate feed and a recycle at the bottom ends between desorption and adsorption beds. In the Leavitt process, argon is purified from its mixture with about 100 ppm nitrogen using 13× molecular sieve and operating at 105–210 kPa pressure range and at ambient temperature. However, Leavitt's Duplex process does not utilize simultaneous removal of oxygen and nitrogen, and thus does not provide a complete argon purification process.

SUMMARY OF THE INVENTION

It is an object of the present invention to provide an advanced PSA purification process which is capable of delivering a gas, such as argon, at high purity and high recovery. More specifically, it is an object of the instant invention to provide an improved crude argon purification process which does not require any additional purification or recycling from PSA back to the cryogenic air separation plant for higher argon recovery. In addition, the instant invention is intended to use more efficient process cycle and adsorbents.

In a preferred embodiment, the instant invention preferably provides an improved Duplex process with simultaneous removal of both oxygen and nitrogen. Therefore, it is a complete argon purification process, and there is no need for recycle from PSA to the cryogenic unit. In addition, in a preferred embodiment, the instant invention enhances process performance and economics by using improved adsorbents (e.g., LiX zeolite with $SiO_2/Al_2O_3$ ratio of 2.0–2.5, CMS and materials disclosed by Ramprasad et al. in U.S. Pat. No. 5,294,418) and process cycle (short cycle time and overlapping steps). Additionally, in a preferred embodiment, the instant invention uses improved bed-to-bed interactions such as dual end pressure transfer.

In a more preferred embodiment, starting with crude argon (e.g., 97.5% Ar, 1.5% $O_2$ and 1% $N_2$) from a cryogenic air separation plant, the instant invention can purify argon to over 99.999% purity and with high recovery over 70% (theoretically as high as 99%) while employing only a Duplex PSA system with no recycle requirement of the argon in the PSA waste stream to the cryogenic air separation unit.

An improved process of this invention is characterized by one or more of the following:

a Duplex PSA system for crude argon purification with simultaneous removal of oxygen and nitrogen;

high purity and recovery of argon product;

a complete purification system: no need for recycle from the PSA to the cryogenic air separation unit and further purification;

use of advanced materials such as nitrogen selective (e.g., LiX) and oxygen equilibrium selective adsorbent (e.g., TEC); and improved process cycle: overlapping steps, fast cycle and bed-to-bed interaction.

BRIEF DESCRIPTION OF THE DRAWINGS

The invention is hereinafter described in detail with reference to the accompanying drawings in which.

DETAILED DESCRIPTION OF THE INVENTION

The improved process of this invention preferably comprises a duplex pressure swing adsorption process for purifying an argon-containing feed gas stream in a system having at least first and second pressure swing adsorption stages for selectively adsorbing/desorbing one or more of oxygen and nitrogen from the feed gas stream containing argon, each adsorption/desorption stage having an upper bed and a lower bed in fluid communication with each other and each bed of each stage containing adsorbent(s) for one or more of oxygen and nitrogen, each bed of each stage having upper and lower ends. When multiple adsorbents for adsorption of multiple gases are employed in the beds, these different adsorbents are preferably arranged in the beds in a layered or tiered manner.

One preferred embodiment preferably comprises a duplex pressure swing adsorption process for purifying a product gas from a feed gas stream in a system having at least first and second pressure swing adsorption stages for selectively adsorbing/desorbing one or more of impurity gases from the feed gas stream containing product gas, each stage having an upper bed and a lower bed in fluid communication with each other and each bed of each stage containing one or more adsorbents for adsorption of one or more impurity gases, the process preferably comprising:

provi­ding the feed gas stream to the first pressure swing adsorption stage and adsorbing one or more of the impurity gases from the feed gas stream and collecting purified product gas as effluent from the upper bed of the stage, desorbing one or more impurity gases from adsorbent(s) in the second pressure swing adsorption stage to provide a recyclable stream containing the desorbed gas(es), recycling at least a portion of the recyclable stream from the second stage to the lower bed of the first adsorption stage and adsorbing in the lower bed one or more impurity gases from the recyclable stream thereby providing a purified recyclable stream as effluent from the lower bed to the upper bed of the first stage.

Another preferred embodiment of the process comprising the following sequence of steps:

(a) providing pressurized feed gas from the argon containing feed gas stream to the lower end of the upper bed of the first stage; providing pressurized effluent from the upper end of the lower bed of the first stage to the lower end of the upper bed of the first stage; the effluent from the lower bed of the first stage being a first portion of recycled gas from the lower end of the lower bed of the second stage to the lower end of the lower bed of the first stage, and passed through the adsorbent in said lower bed of the first stage whereby at least one or more of oxygen and nitrogen is adsorbed from said recycled gas; and withdrawing a second portion of desorbed gas from the lower end of the lower bed of the second stage as waste gas;

(b) providing pressurized, purified argon product gas from an argon product stream to the upper end of the upper bed of the first stage;

(c) permitting the upper bed of the first stage to reach the desired adsorption pressure then terminating flow of argon product from the product stream to the upper end of the upper bed of the first stage and permitting the adsorbent in the upper bed of the first stage to adsorb one or more of oxygen and nitrogen from the gas in the upper bed of the first stage;

(d) collecting purified argon product gas from effluent from the upper end of the upper bed of the first stage;

(e) providing a portion of the effluent from step (d) as a purge gas to the upper end of the upper bed of the second stage to desorb adsorbed gas(es) from the adsorbent in the upper and lower beds of the second stage and evacuating the desorbed gas from the lower end of the lower bed of the second stage to provide the recycled desorbed gas of step (a);

(f) after substantially desorbing all adsorbed gas(es) from the adsorbent in the upper and lower beds of the second stage, terminating the providing of a portion of the effluent in step (e) to the upper end of the upper bed of the second stage;

(g) continue permitting the adsorbent in the upper bed of the first stage to adsorb one or more of oxygen and nitrogen from the gas in the upper bed of the first stage;

(h) when purity of the argon product from the effluent from the upper bed of the first stage is no longer acceptable, terminating collection of the purified argon product, terminating the providing of pressurized feed gas from the argon feed gas stream to the upper bed of the first stage; terminating the providing of the first portion of the recycled desorbed gas from the lower end of the lower bed of the second stage to the lower end of the lower bed of the first stage, and terminating withdrawing the second portion of the desorbed gas from the lower end of the lower bed of the second stage as waste gas;

(i) equalizing the pressure in the beds of the two adsorption stages;

(j) terminating pressure equalization step (i);

(k) providing pressurized feed gas from the argon containing feed gas stream to the lower end of the upper bed of the second stage; providing pressurized effluent from the upper end of the lower bed of the second stage to the lower end of the upper bed of the second stage; the effluent from the lower bed of the second stage being a first portion of recycled gas from the lower end of the lower bed of the first stage to the lower end of the lower bed of the second stage, and passed through the adsorbent in said lower bed of the second stage whereby at least one or more of oxygen and nitrogen is adsorbed from said recycle gas; and withdrawing a second portion of desorbed gas from the lower end of the lower bed of the first stage as waste gas;

(l) providing pressurized, purified argon product gas from an argon product stream to the upper end of the upper bed of the second stage;

(m) permitting the upper bed of the second stage to reach the desired adsorption pressure then terminating flow of argon product from the product stream to the upper end of the upper bed of the second stage and permitting the adsorbent in the upper bed of the second stage to adsorb one or more of oxygen and nitrogen from the gas in the upper bed of the first stage;

(n) collecting purified argon product gas from effluent from the upper end of the upper bed of the second stage;

(o) providing a portion of the effluent from step (n) as a purge gas to the upper end of the upper bed of the first stage to desorb adsorbed gas(es) from the adsorbent in the upper and lower beds of the first stage and evacuating the desorbed gas from the lower end of the lower bed of the first stage to provide the recycled desorbed gas of step (k);

(p) after substantially desorbing all adsorbed gas(es) from the adsorbent in the upper and lower beds of the first stage, terminating the providing of a portion of the effluent in step (o) to the upper end of the upper bed of the first stage;

(q) continue permitting the adsorbent in the upper bed of the second stage to adsorb one or more of oxygen and nitrogen from the gas in the upper bed of the second stage;

(r) when purity of argon the product from the effluent from the upper bed of the second stage is no longer acceptable, terminating collection of the purified argon product, terminating the providing of pressurized feed gas from the argon feed gas stream to the upper bed of the second stage; terminating the providing of the first portion of the recycled desorbed gas from the lower end of the lower bed of the first stage to the lower end of the lower bed of the second stage, and terminating withdrawing the second portion of the desorbed gas from the lower end of the lower bed of the first stage as waste gas;

(s) equalizing the pressure in the beds of the two adsorption stages; and (t) terminating pressure equalization step (s).

The equalization of the pressure in the beds of the two adsorption stages is preferably conducted in a (1) top end of the upper bed of the first stage to the top end of the upper bed of the second stage, and (2) bottom end of the bottom bed of the first stage to the bottom end of the bottom bed of the second stage mode for step (i) and in a (3) top end of the upper bed of the second stage to the top end of the upper bed of the first stage, and (4) bottom end of the bottom bed of the second stage to the bottom end of the bottom bed of the first stage mode in step (s).

Figure 3:
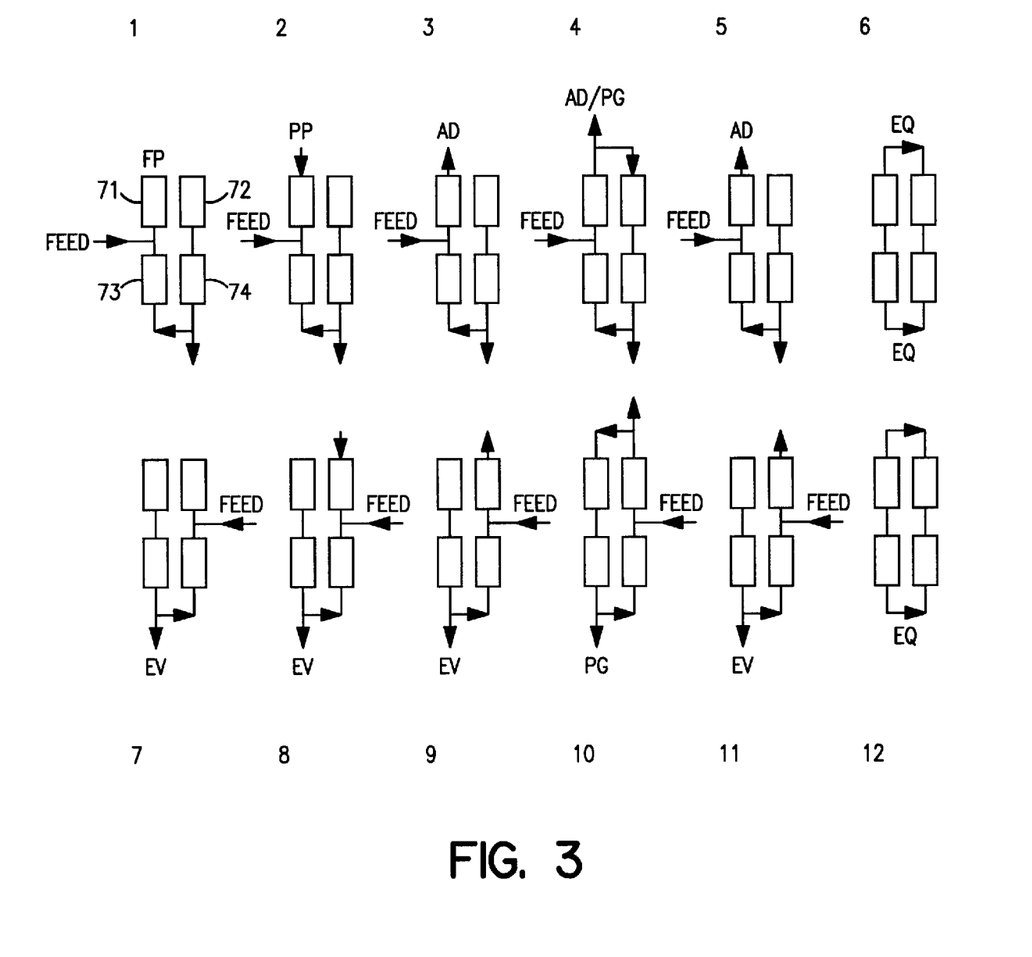
FIG. 3 is a diagrammatic illustration of the steps of the first and second halves of the improved pressure swing adsorption process of the invention.

Referring first to FIG. 3, there is a diagrammatic illustration of the cycle of steps for each set of beds of the improved pressure swing adsorption process of this invention. The upper portion of the diagram illustrates the first half of the PSA cycle, and the lower portion of the diagram illustrates the second half of the cycle involving the four beds, namely beds 71, 72, 73 and 74. The cycle for the beds of each of the two pressure swing adsorption stages consists of the following twelve steps:

1. Feed pressurization (FP): passing the feed to the intermediate point between beds 71 and 73 and also passing the recycled gas to the bottom end of the lower bed 73.
2. Simultaneous feed and product pressurization (PP): in addition to the feed and recycle streams, connecting a countercurrent product stream to the top end of the upper bed 71 to push the impurity fronts back into the adsorber.
3. Adsorption (AD): Adsorption taking place and product being withdrawn from the top of the upper bed 71.
4. Adsorption and purge (AD/PG): Adsorption continuing, but a portion of the product being directed as purge gas to the top low pressure bed 72.
5. Adsorption (AD): Purge stopped, adsorption continues.
6. Equalization (EQ): Simultaneously equalizing pressure by top-top and bottom-bottom bed 71 and 73 interactions with the low pressure beds 72 and 74.
7. Evacuation (EV): terminating equalization, countercurrently depressurizing from the bottom of the adsorber bed 73.
8. Evacuation (EV): evacuating the adsorber beds 71 and 73.
9. Evacuation (EV): evacuating the adsorber beds 71 and 73.
10. Evacuation and purge (EV/PG): evacuation continuing, a product purge stream is connected to the top end of the upper bed 71 to clean the residual impurities.
11. Evacuation (EV): terminating purge, evacuation continuing.
12. Equalization (EQ): Simultaneously equalizing pressure in beds 71 and 73 with the high pressure beds 72 and 74.

Figure 1:
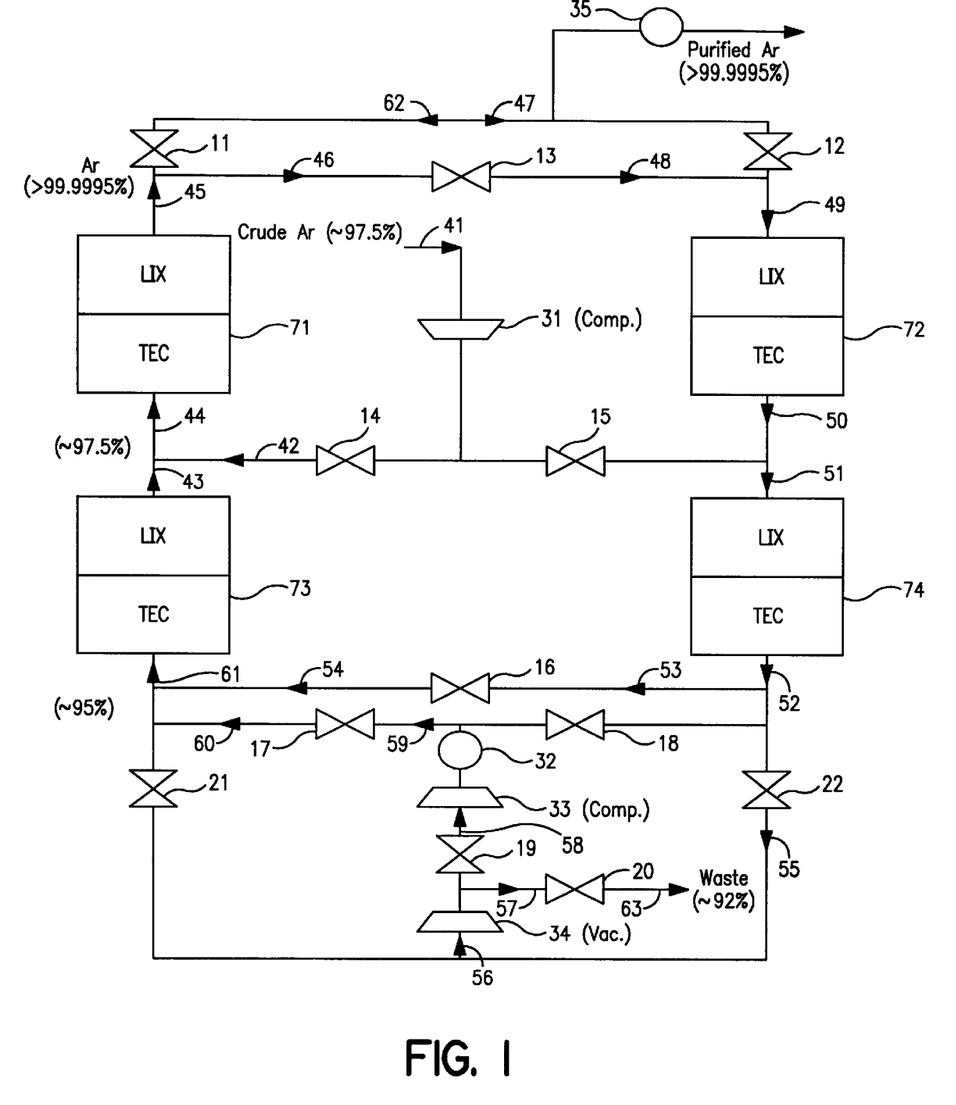
FIG. 1 is a schematic drawing illustrating the first half of the improved pressure swing adsorption cycle of the invention.
Figure 2:
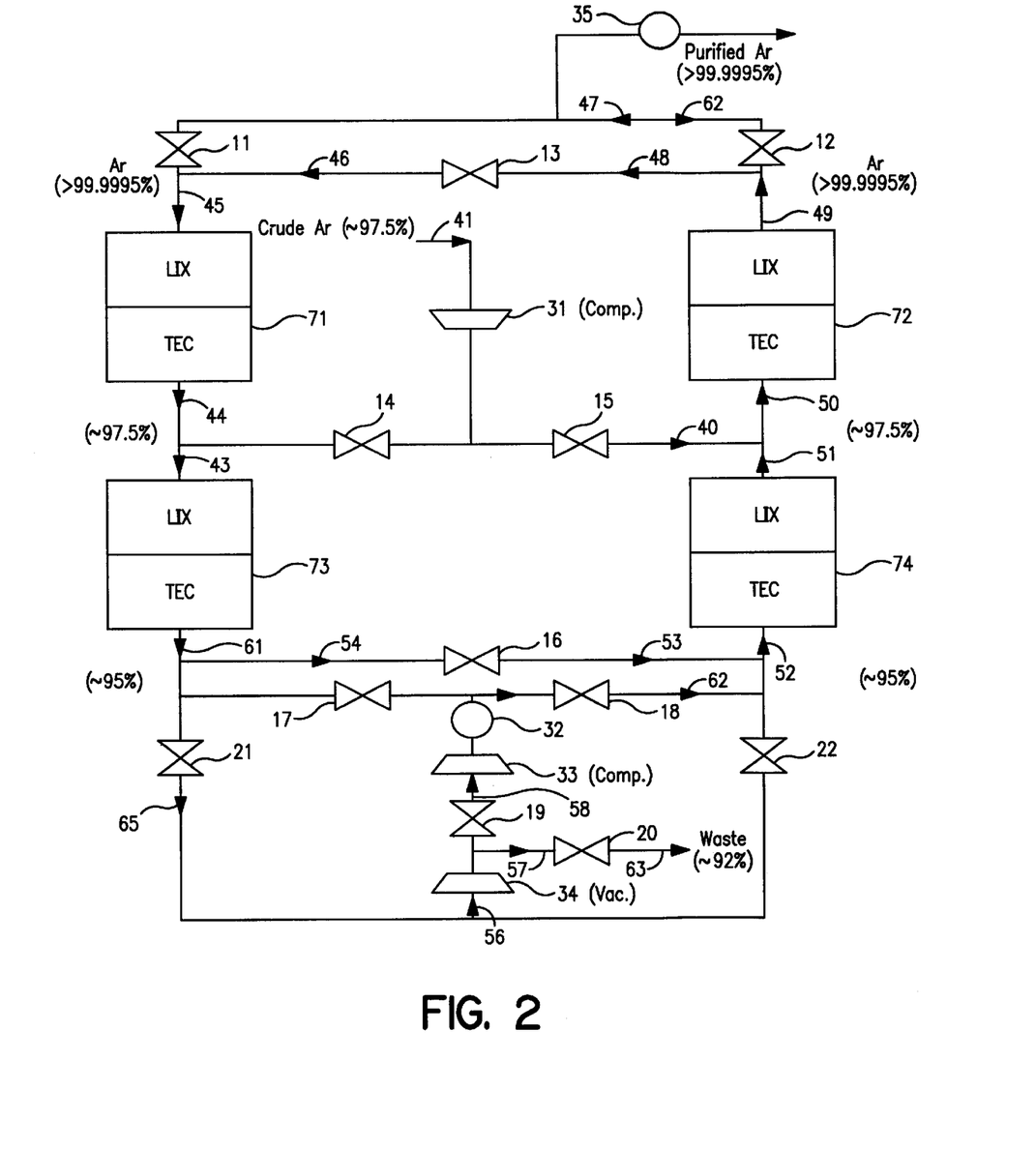
FIG. 2 is a schematic drawing illustrating a second half of the improved pressure swing adsorption cycle of the invention.

FIGS. 1 and 2 illustrate a basic Duplex PSA process embodiment using four beds (71, 72, 73 & 74), i.e., two stages of two beds each. The intermediate point between the upper bed 71 and the lower bed 73 is connected to a compressor 31 for providing the feed 42 into the bed. A vacuum pump 34 is connected to the bottom end of the lower bed 74 for evacuating the bed to pressures below ambient. A portion 56 of evacuating gas rich in oxygen and nitrogen impurities is rejected as waste in line 63. A compressor 33 and a storage tank 32 can also be connected to this end for recycling another portion 60 from the desorption bed 74 back to the adsorption bed 73.

For crude argon purification, the upper bed 71 of the Duplex process is normally a large bed, and the lower bed 73 is a small one. First, this disproportion comes from the different functionality of these two beds. The upper bed is for purification while the lower bed is for argon enrichment. Here, the purification is much more difficult and requires much larger amounts of adsorbent than the enrichment. Second, the disproportion results from the different flow rates in the two beds. The flow rate in the upper bed is much higher than in the lower one, and is in fact the sum of the flow rates in the lower bed and the intermediate feed.

Each bed can be filled with one or more layers of adsorbents. In case of both oxygen and nitrogen removal, two layers are required in each bed as shown in FIGS. 1 and 2. The top layer consists of a nitrogen selective adsorbent such as type X zeolite or highly exchanged (e.g. $\geq 86\%$ Li) LiX zeolite ($SiO_2/Al_2O_3$ ratio of 2.0 to 2.5), and the bottom layer consists of an oxygen selective adsorbent such as CMS and transition element complexes (TECs). A preferred TEC, typically abbreviated as Co{3.5-diBu'sal/(EtO)(CO$_2$Et)Hmal-DAP}, is the cobalt(II) complex of the dianion of a chelating ligand prepared formally by the 1:1 condensation of ethoxymethylene-diethylmalonate and 3,4-diamino-pyridine, followed Schiff base condensation of the remaining primary amine group with 3,5-di-tert-butysalicylaldehyde. Other preferred TEC's include Co{(Me$_2$Ac$_2$H$_2$malen}(4-PyOLi); Co{Me$_2$Ac$_2$H$_2$maltmen}(4-PyOLi); and Co{Me$_2$Ac$_2$H$_2$maldmen}(4-PyOLi).

The most preferred adsorbents are highly exchanged LiX and TECs, because of their high capacity and selectivity, and fast mass transfer rates. Such adsorbents are described in co-pending, commonly assigned U.S. patent applications Ser. No. 09/225,052 (Stephenson et al), Ser. No. 09/458,066 (Zhang et al); Ser. No. 09/725,845 (attorney ref: D-20743-1) (Zhang et al); U.S. Pat. No. 5,945,079 (Mullhaupt et al), and U.S. Pat. No. 4,859,217 (Chao) and in published PCT application U.S. Pat. No. 99/04219 (Chao et al).

Now referring to FIGS. 1, 2 and 3, and the following Table 1, the operation of the Duplex PSA process is described as follows:

TABLE 1

Duplex PSA Process Valve Switching
(O = Opened, C = Closed)

| Steps/Valves | 11 | 12 | 13 | 14 | 15 | 16 | 17 | 18 | 19 | 20 | 21 | 22 |
|---|---|---|---|---|---|---|---|---|---|---|---|---|
| 1. FP | C | C | C | O | C | C | O | C | O | O | C | O |
| 2. PP | O | C | C | O | C | C | O | C | O | O | C | O |
| 3. AD | O | C | C | O | C | C | O | C | O | O | C | O |
| 4. AD/PG | O | C | O | O | C | C | O | C | O | O | C | O |
| 5. AD | O | C | C | O | C | C | O | C | O | O | C | O |
| 6. EQ | C | C | O | C | O | C | C | C | C | C | C | C |
| 7. EV | C | C | C | C | O | C | C | O | O | O | O | C |
| 8. EV | C | O | C | C | O | C | C | O | O | O | O | C |
| 9. EV | C | O | C | C | O | C | C | O | O | O | O | C |
| 10. EV/PG | C | O | O | C | O | C | C | O | O | O | O | C |
| 11. EV | C | O | C | C | O | C | C | O | O | O | O | C |
| 12. EQ | C | C | O | C | C | O | C | C | C | C | C | C |

The process is started with valves 11, 12, 13, 15, 16, 18 and 21 closed and valves 14, 17, 19, 20 and 22 open.

During feed pressurization step (step 1), crude argon feed stream 41 from a cryogenic air separation unit is sent to blower 31. Passing valve 14, this feed stream 42 mixes at an intermediate point (between the upper bed 71 and the lower bed 73) with another effluent 43 exiting from the lower bed 73. The mixture 44 pressurizes bed 71. The lower bed 73 is pressurized by a recycle stream 61 from line 60 through valve 17 which is provided by a portion 58 of the evacuation gas 52 from the other two beds 72 and 74 undergoing desorption. The desorbed gas 52 passes through valve 22 of lines 55 and 56 and vacuum pump 34 if needed. One part 58 of this gas is directed via valve 19 then pressurized by compressor 33 and stored in an optional tank 32, finally recycled as stream 61 back to bed 73 through line 59, valve 17 and line 60. The remaining part 57 of the desorption gas 52 is passed as waste 63 through valve 20. The waste stream flow could be adjusted as a function of the waste composition. The composition of feed stream 42 and effluent stream 43 are preferably substantially the same.

Before reaching the adsorption pressure, in addition to feed 42 and recycle streams 43, a third stream 62 from product tank or storage tank 35 is countercurrently introduced into bed 71 at the top through valve 11 which is opened to permit the product pressurization step (step 2) to start. This product pressurization pushes the impurity fronts back into the bed 71, and also sharpens the mass transfer zone and increases product purity. The step overlapping decreases the cycle time and increases productivity.

When adsorption pressure is reached, product pressurization is stopped, and then adsorption and production step (step 3) starts. Argon product stream 47 is collected through valve 11. After a certain time, valve 13 is opened and the stream 45 exiting from bed 71 is split into two parts. One part 47 continues to be collected as product through valve 11 while the other part 46 is passed as purge gas through valve 13 and lines 48 and 49 to the lower pressure bed 72. This is adsorption and purge step (step 4). The purge is then stopped by closing valve 13 after the desorption beds 72 and 74 are cleaned, and another adsorption and production step (step 5) similar to step 3 takes place. During these steps 3 to 5, beds 72 and 74 continue desorption and evacuation (steps 7–11). Finally, when the product purity in bed 71 is no longer acceptable, the adsorption is stopped and valves 11, 14, 17, 19, 20 and 22 are closed and valves 13 and 16 are opened. A dual end (top-top and bottom-bottom) equalization step (step 6) starts.

For operation of the second half of the cycle valves 13 and 16 are closed and valves 15 and 18 are opened. Referring to FIG. 2, the second half of the PSA cycle is disclosed. Crude argon feed stream 41 from the cryogenic air separation unit is sent from blower 31 to valve 15, this feed stream 40 (see FIG. 2) mixes at an intermediate point (between the upper bed 72 and the lower bed 74) with another effluent 51 exiting from the lower bed 74. The mixture 50 pressurizes bed 72. The lower bed 74 is pressurized by a recycle stream 52 through valve 18 which is provided by a portion 56 of the evacuation gas 61 from the other two beds 71 and 73 undergoing desorption step. The desorbed gas 61 passes through valve 21, lines 56 and 65 and vacuum pump 34 if needed. One part 58 of this gas is directed via valve 19 and pressurized by compressor 33 and stored in an optional tank 32, finally recycled back as stream 52 to bed 74 through valve 18 and line 82. The remaining part 57 of the desorption gas 61 is passed as waste 63 through valve 20. The waste stream flow could be adjusted as a function of the waste composition.

Before reaching the adsorption pressure, in addition to feed 40 and recycle streams 61, a third stream 62 from product tank or storage tank 35 is countercurrently introduced into bed 72 at the top through valve 12 which is opened to permit product pressurization step to start. This product pressurization pushes the impurity fronts back into the bed 72, and also sharpens the mass transfer zone and increases product purity. The step overlapping decreases the cycle time and increases productivity.

When adsorption pressure is reached, product pressurization is stopped, and then adsorption and production step starts. Argon product stream 47 is collected through valve 12. After a certain time, valve 13 is opened and the stream 49 exiting from bed 72 is split into two parts. One part 47 continues to be collected as product through valve 12 while the other part 48 is passed as purge gas through valve 13 and lines 46 and 45 to the lower pressure bed 71. This is an adsorption and purge step. The purge is then stopped by closing valve 13 after the desorption beds 71 and 73 are cleaned, and another adsorption and production step takes place. During these steps, beds 71 and 73 continue desorption and evacuation. Finally, when the product purity in bed 72 is no longer acceptable, the adsorption is stopped and valves 12, 15, 18, 19, 20 and 21 are closed and valves 13 and 16 opened. A dual end (top-top and bottom-bottom) then equalization step starts.

The second half cycle is shown by FIG. 2, and the lower diagram in FIG. 3 is just the opposite of the first half, i.e., beds 71 and 73 functionally become beds 72 and 74.

Two significant features of the Duplex process of this invention, which distinguish the process from a conventional Simplex process, are the recycle from the lower pressure bed to the higher pressure bed and the intermediate feed. These two features are respectively characterized by the following two parameters: recycle/feed flow ratio and upper/lower bed ratio separated by the intermediate feed point. The art of the Duplex process design consists of choosing the right values of these parameters.

The recycle flow ratio defines directly the Duplex process recovery. Higher recycle ratio gives higher recovery. For crude argon purification, significant recycle is needed for a high argon recovery. This ratio should be determined by the optimization of the entire process and also process economics. The upper/lower bed ratio is selected such as to approximately match the concentrations of the feed and the recycled gas exiting from the top of the high pressure lower bed. Therefore, an ideal situation should be that the feed and the recycle coming out of the lower bed have the same purity. So the ratio should be determined by the purity matching. For crude argon purification, a very small bed is normally sufficient to increase the recycled waste purity to the feed purity level.

An example of the Duplex process of the instant invention for crude argon purification is given for removal of both oxygen and nitrogen impurities. As a comparison, the performance of a conventional Simplex process is also provided. The process is operated around ambient temperature (approximately 300 K).

EXAMPLE 1

This example compares a Duplex system with a Simplex system. Both oxygen (1.5%) and nitrogen (1%) are removed in this example from crude argon. The most preferred mode, for the present PSA is a complete argon purification system. There is no need for any further purification or recycling back to the cryogenic air separation unit. Two adsorbent layers are employed in each bed as shown in FIGS. 1 and 2: one layer of oxygen equilibrium selective adsorbent, TEC and another layer of nitrogen equilibrium selective adsorbent, highly exchanged LiX zeolite in each bed. The recycle flow ratio is about 1.5. Key Duplex process conditions are listed in Table 2.

TABLE 2

Process Conditions Using TEC and Zeolite

| Bed characteristics | | Operating conditions | |
|---|---|---|---|
| Length (= upper + lower) (m) | 1.2 | Feed composition, $Ar/O_2/N_2$ (%) | 97.5/1.5/1 |
| Upper/lower length ratio | 7.6 | Feed flow $(mol/m^2\text{-s})$ | 4.5 |
| Diameter (m) | 1.1284 | Cycle averaged recycling flow $(mol/m^2\text{-s})$ | 7 |
| Void fraction ($\epsilon_b$) | 0.36 | $P_h$ (bar) | 2.5 |
| End space fraction | 8% | $P_l$ (bar) | 0.3 |
| Adsorbent layer ratio in each bed (LiX/TEC) | 1 | Cycle time (s) | 6.6 |
| Adsorbent bulk density $(Kg/m^3)$ | 662 & 600 | | |

The total process cycle time breakdown is shown in Table 3.

TABLE 3

Cycle Step Time Using TEC and Zeolite

| Process Steps | Duration (s) | Process Steps |
|---|---|---|
| 1. FP | 0.4 | 7. EV |
| 2. PP | 0.2 | 8. EV |
| 3. AD | 0.7 | 9. EV |
| 4. AD/PG | 0.9 | 10. EV/PG |
| 5. AD | 0.2 | 11. EV |
| 6. EQ | 0.9 | 12. EQ/FP |

A continuous feed is introduced, as indicated by Step 12 (EQ/FP) in this example. This overlapping step reduces the pressurization time and then the overall cycle time. The performance of this process is given in the Table 4.

TABLE 4

Process Performance

| Process performance | Duplex | Simplex |
|---|---|---|
| Argon purity (%) | 99.9995 | 99.9995 |
| Argon recovery (%) | 70 | 55 |
| Bed Size Factor (lb/TPD) | 40 | 28 |

This example demonstrates that crude argon can be purified effectively a Duplex PSA of the instant invention with high recovery using advanced system, process cycle and adsorbents. Especially, the instant invention offers a complete PSA purification unit without any recycling back to air separation unit. This is not possible with a conventional Simplex type of PSA for its limited argon recovery.

For better process performance, the recycle of the desorption gas from the low pressure bed to the high pressure bed should be done by selecting the portion with the highest argon concentration. This is only achievable by a thorough process simulation and a careful analysis of the desorption gas stream history. Both the oxygen and nitrogen selective adsorbents must be used in each bed for high argon recovery as shown in FIGS. 1 and 2. This is only understood after the thorough simulation of the entire process. The simulation indicates that compared with only oxygen removal, a much larger amount of the recycle from the low pressure bed to the high pressure bed is required for removing both oxygen and nitrogen to give high argon recovery. The large amount of the recycle contains significant oxygen and nitrogen impurities, which requires both adsorbents in the lower bed to reduce the impurity concentrations.

A key objective of the invention is to provide an improved Duplex process for purification with both high purity and recovery requirement, especially crude argon purification, as shown in Example 1. But the practice of the invention should not be limited to only this case. For instance, the process could be applied to the following examples of argon purification for removing only oxygen, while nitrogen is removed from crude argon by cryogenic distillation.

EXAMPLE 2

Figure 4:
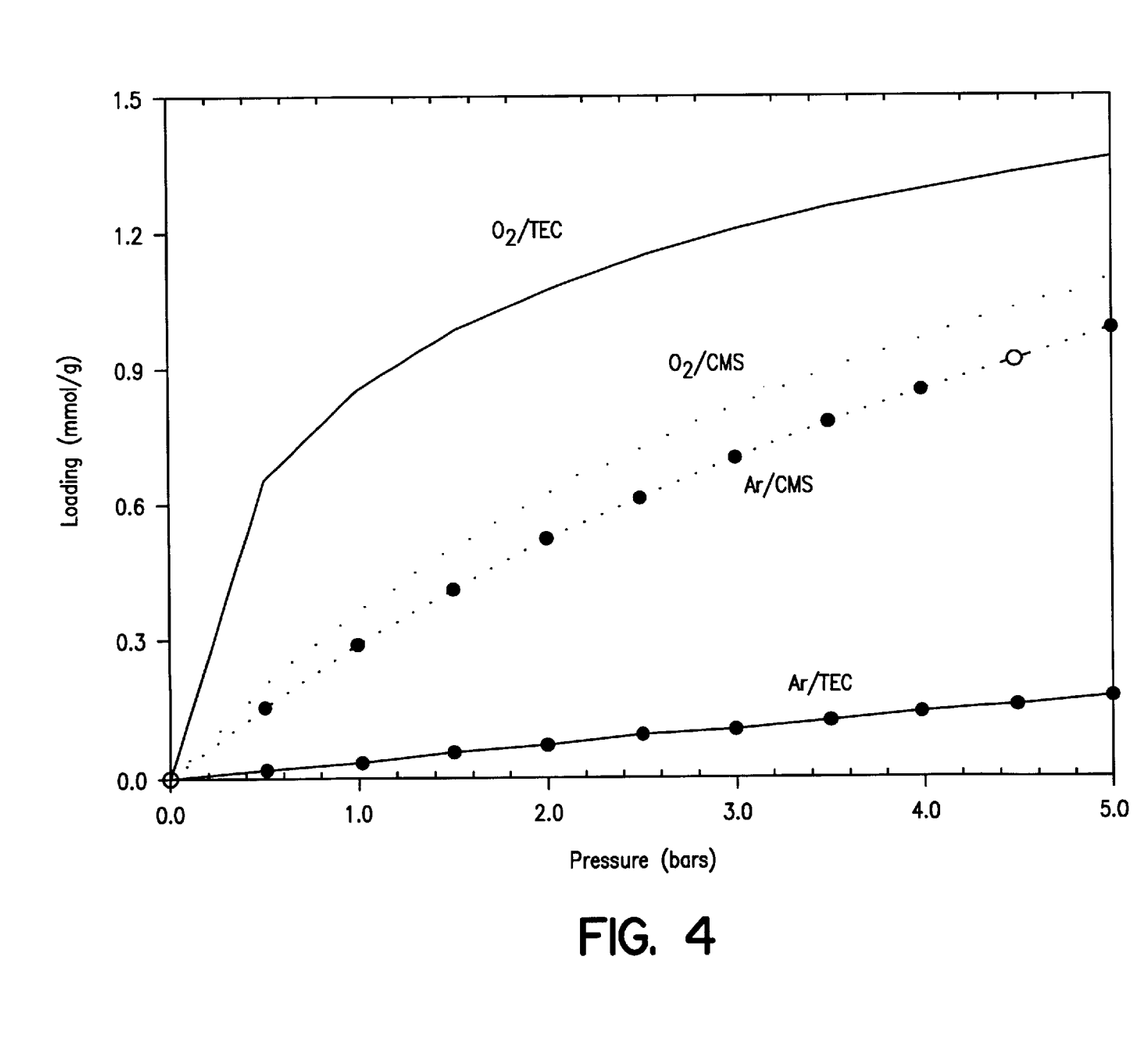
FIG. 4 is a graph illustrating the loading isotherms for oxygen and argon gases on CMS and TEC adsorbents.
Figure 5:
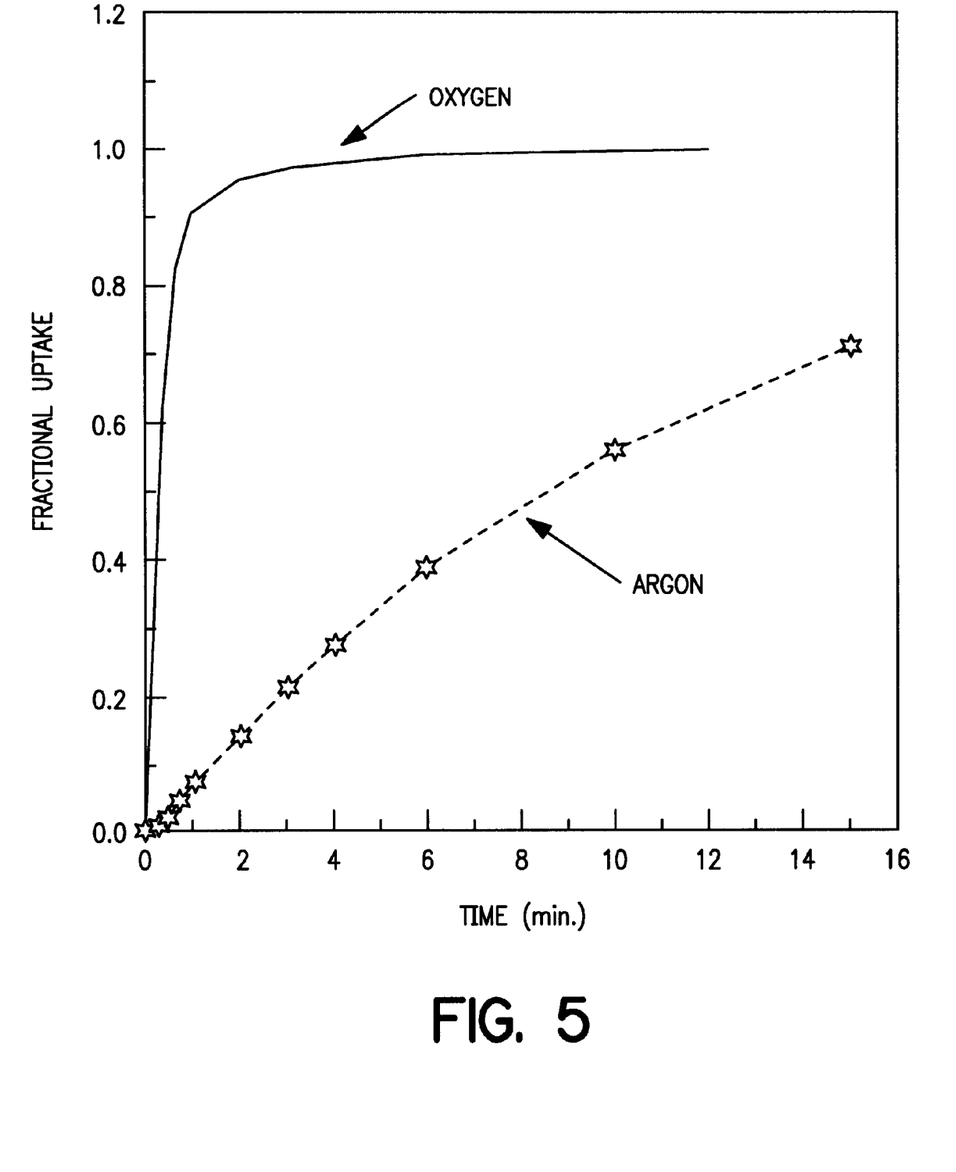
FIG. 5 is a graph of the uptake curves illustrating the mass transfer rates of oxygen and argon on CMS adsorbent.

This example compares a Duplex system with a Simplex system of prior art to remove only oxygen by PSA and using a commercially available adsorbent, oxygen rate selective carbon molecular sieve (CMS). The PSA waste is recycled back to the air separation unit for nitrogen removal in a high ratio column. This is a hybrid PSA-cryogenic purification system. Oxygen and argon have very similar equilibrium properties on this material as shown in FIG. 4. The selectivity mainly comes from their different mass transfer rates as illustrated by the uptake curves in FIG. 5. Key Duplex process conditions are listed in Table 5.

TABLE 5

Process Conditions Using CMS

| Bed characteristics | | Operating conditions | |
|---|---|---|---|
| Length (= upper + lower) (m) | 3 | Feed composition, $Ar/O_2/N_2$ (%) | 98.5/1.5 |
| Upper/lower length ratio | 16 | Feed flow $(mol/m^2\text{-s})$ | 6 |
| Diameter (m) | 1.1284 | Cycle averaged recycling flow $(mol/m^2\text{-s})$ | 6.6 |
| Void fraction ($\epsilon_b$) | 0.4 | $P_h$ (bar) | 5 |
| End space fraction | 8% | $P_l$ (bar) | 0.15 |
| Adsorbent bulk density $(Kg/m^3)$ | 706 | Cycle time (s) | 90 |

The total process cycle time breakdown is shown in Table 6.

TABLE 6

Cycle Step Time Using CMS

| Process Steps | Duration (s) | Process Steps |
|---|---|---|
| 1. FP | 7 | 7. EV |
| 2. PP | 7 | 8. EV |

TABLE 6-continued

Cycle Step Time Using CMS

| Process Steps | Duration (s) | Process Steps |
|---|---|---|
| 3. AD | 11 | 9. EV |
| 4. AD/PG | 9 | 10. EV/PG |
| 5. AD | 7 | 11. EV |
| 6. EQ | 4 | 12. EQ |

The Duplex process is simulated using the above conditions. Its performance is given in Table 7. This set of conditions result from a balanced consideration of compression and adsorbent costs. The Simplex process performance is also given as a comparison, which is not only simulated but also experimentally tested in this case.

TABLE 7

Process performance Using CMS

| Process performance | Duplex | Simplex |
|---|---|---|
| Argon purity (%) | 99.9995 | 99.9995 |
| Argon recovery (%) | 70 | 40 |
| Bed Size Factor (lb/TPD) | 700 | 500 |

Table 7 shows that the Duplex process can significantly increase argon recovery over the Simplex PSA process. However the higher recovery requires a recycling equipment and larger adsorbent inventory.

EXAMPLE 3

Similar to Example 2, this example deals with only oxygen removal by Duplex PSA. However, CMS adsorbent in the previous example is now replaced by a much advanced material, an oxygen equilibrium selective adsorbent—TEC. A comparison of oxygen and argon isotherms between TEC and CMS is shown in FIG. 4. The mass transfer rates of oxygen and argon are very fast on TEC. Key Duplex process conditions are listed in Table 8.

TABLE 8

Process Conditions Using TEC

| Bed characteristics | | Operating conditions | |
|---|---|---|---|
| Length (= upper + lower) (m) | 0.6 | Feed composition, $Ar/O_2/N_2$ (%) | 98.5/1.5 |
| Upper/lower length ratio | 11 | Feed flow (mol/m²-s) | 7 |
| Diameter (m) | 1.1284 | Cycle averaged recycling flow (mol/m²-s) | 2.7 |
| Void fraction ($\epsilon_b$) | 0.36 | $P_h$ (bar) | 2.5 |
| End space fraction | 8% | $P_l$ (bar) | 0.3 |
| Adsorbent bulk density (Kg/m³) | 662 | Cycle time (s) | 9 |

The total process cycle time breakdown is shown in Table 9.

TABLE 9

Cycle Step Time Using TEC

| Process Steps | Duration (s) | Process Steps |
|---|---|---|
| 1. FP | 0.2 | 7. EV |
| 2. PP | 0.1 | 8. EV |
| 3. AD | 0.1 | 9. EV |
| 4. AD/PG | 3 | 10. EV/PG |
| 5. AD | 0.1 | 11. EV |
| 6. EQ | 1 | 12. EQ |

The performance of this process is given in the Table 10.

TABLE 10

Process Performance Using TEC

| Process performance | Duplex | Simplex |
|---|---|---|
| Argon purity (%) | 99.9995 | 99.9995 |
| Argon recovery (%) | 90 | 65 |
| Bed Size Factor (lb/TPD) | 10 | 7 |

Using the new $O_2$ equilibrium selective adsorbent (TEC), the process performance is dramatically improved by the faster adsorption mass transfer rate, higher capacity and selectivity of the new material. A much smaller adsorber is needed comparing with Example 1. The productivity (the inverse of bed size factor) is increased roughly by a factor of 70. The high selectivity and capacity also significantly increase argon recovery not only for Duplex process but also for the Simplex process. Consequently, a smaller recycle ratio is sufficient for a high Duplex recovery.

It is worth noting that these simulation results are obtained for the purpose of demonstration. The values can be different depending on different circumstances. For example, a higher recovery can be obtained in these examples if a higher recycle ratio is used. It is also worth noting that without departing from the scope of the instant invention, the process performance of these examples could be improved by incorporating other additional steps. For instance, continuous evacuation can be obtained by adding simultaneous evacuation into the equalization step. The continuous feed and evacuation can reduce cycle time and also fully utilize the equipment. An additional evacuation from the intermediate point could be useful for a faster evacuation time and improved performance. Finally, equalization could be improved for involving an intermediate point.

In addition to argon purification illustrated by the above three examples, the instant invention could be used for any gas purification, recovery and separations. Although the invention process is presented for purifying argon that is a light component, the invention process could be modified for a heavy component, such as $CO_2$, separation and purification by switching over the waste and product collection points. The process could also be used for producing more than one product by adding a second product stream at the intermediate or bottom end, for example, argon/oxygen coproduction from air, carbon monoxide/hydrogen and carbon dioxide/hydrogen from syngas, etc. The high recovery of the instant invention is a key advantage for coproduction processes.

The process, although preferably operated with a four-bed embodiment, could be practiced with different totals of beds. The bed configuration does not have to be conventionally vertical, but could as well be radial or shallow beds. The invention is not restricted to layered adsorbents, and could be used with mixed adsorbents. In addition, different beds may use different adsorbents and the order of layering may change too. The adsorbents should not be limited to oxygen and nitrogen selective adsorbents mentioned in the instant invention, other adsorbents could be deployed as well.

Although the process of the invention is preferably operated near atmospheric pressures and ambient temperature, it could be applied to a full range of process conditions, e.g., pressures, temperature, and flow rate, etc.

The instant invention teaches a method of choosing the upper/lower bed ratio and recycle flow ratio. However, there may be cases where some mixing between the feed and recycle streams is desired, then the purity matching is not necessary for choosing the ratio. It is apparent that the recycle between the low and high pressure beds is not necessarily at the bottom ends, it could be from or to any single or multiple points, e.g., the intermediate point. Similarly, the evacuation of the desorption beds is not limited to the bottom end as shown in FIG. 3; it could be any end including the intermediate or any combination of these ends.

The equalization or any other interaction between the low and high pressure beds is not limited to what is described in the instant invention. There may be cases where a different equalization can be practiced, e.g., from top to intermediate, from intermediate to bottom, or any possible combination.

With the foregoing description of the invention, those skilled in the art will appreciate that modifications may be made to the invention without departing from the spirit thereof. Therefore, it is not intended that the scope of the invention be limited to the specific embodiments illustrated and described.

We claim:

1. A duplex pressure swing adsorption process for purifying a product gas from a feed gas stream in a system having at least first and second pressure swing adsorption stages for selectively adsorbing/desorbing one or more of impurity gases from the feed gas stream containing product gas, each stage having an upper bed and a lower bed in fluid communication with each other and each bed of each stage containing one or more adsorbents for adsorption of one or more impurity gases, the process comprising:

providing the feed gas stream to the first pressure swing adsorption stage and adsorbing one or more of the impurity gases from the feed gas stream and collecting purified product gas as effluent from the upper bed of the stage, desorbing one or more impurity gases from adsorbent(s) in the second pressure swing adsorption stage to provide a recyclable stream containing the desorbed gas(es), recycling at least a portion of the recyclable stream from the second stage to the lower bed of the first adsorption stage and adsorbing in the lower bed one or more impurity gases from the recyclable stream thereby providing a purified recyclable stream as effluent from the lower bed to the upper bed of the first stage.

2. The process of claim 1 wherein the each bed of the first and second stages contains tiered layers of adsorbent for each impurity gas to be adsorbed.

3. The process according to claim 2 wherein the composition of the purified recyclable stream fed as the effluent from the lower bed to the upper bed of the first stage is of substantially the same composition as the composition of the feed gas stream fed to the first stage.

4. The process according to claim 1 wherein the composition of the purified recyclable stream fed as the effluent from the lower bed to the upper bed of the first stage is of substantially the same composition as the composition of the feed gas stream fed to the first stage.

5. The process according to claim 1 which additionally comprises pressurization of the upper bed of the first stage with a stream of product gas simultaneously with the providing of the feed gas stream to the first stage.

6. The process according to claim 1 which additionally comprises providing as a purge gas to the second stage a portion of the product gas effluent from the first stage.

7. The process according to claim 6 which additionally comprises simultaneous top-top and bottom-bottom pressure equalizations between the beds of the first and second stages.

8. The process according to claim 1 wherein a second portion of the recyclable stream of desorbed gas(es) from the second stage is withdrawn as waste gas.

9. A duplex pressure swing adsorption process for purifying an argon-containing feed gas stream in a system having at least first and second pressure swing adsorption stages for selectively adsorbing/desorbing one or more of oxygen and nitrogen from the feed gas stream containing argon, each stage having an upper bed and a lower bed in fluid communication with each other and each bed of each stage containing one or more adsorbents for one or more of oxygen and nitrogen, each bed of each stage having upper and lower ends, the process comprising the following sequence of steps:

(a) providing pressurized feed gas from the argon containing feed gas stream to the lower end of the upper bed of the first stage; providing pressurized effluent from the upper end of the lower bed of the first stage to the lower end of the upper bed of the first stage; the effluent from the lower bed of the first stage being a first portion of recycled gas from the lower end of the lower bed of the second stage to the lower end of the lower bed of the first stage, and passed through the adsorbent in said lower bed of the first stage whereby at least one or more of oxygen and nitrogen is adsorbed from said recycled gas; and withdrawing a second portion of desorbed gas from the lower end of the lower bed of the second stage as waste gas;

(b) providing pressurized, purified argon product gas from an argon product stream to the upper end of the upper bed of the first stage;

(c) permitting the upper bed of the first stage to reach the desired adsorption pressure then terminating flow of argon product from the product stream to the upper end of the upper bed of the first stage and permitting the adsorbent in the upper bed of the first stage to adsorb one or more of oxygen and nitrogen from the gas in the upper bed of the first stage;

(d) collecting purified argon product gas from effluent from the upper end of the upper bed of the first stage;

(e) providing a portion of the effluent from step (d) as a purge gas to the upper end of the upper bed of the second stage to desorb adsorbed gas(es) from the adsorbent in the upper and lower beds of the second stage and evacuating the desorbed gas from the lower end of the lower bed of the second stage to provide the recycled desorbed gas of step (a);

(f) after substantially desorbing all adsorbed gas(es) from the adsorbent in the upper and lower beds of the second stage, terminating the providing of a portion of the effluent in step (e) to the upper end of the upper bed of the second stage;

(g) continue permitting the adsorbent in the upper bed of the first stage to adsorb one or more of oxygen and nitrogen from the gas in the upper bed of the first stage;

(h) when purity of the argon product from the effluent from the upper bed of the first stage is no longer acceptable, terminating collection of the purified argon product, terminating the providing of pressurized feed gas from the argon feed gas stream to the upper bed of the first stage; terminating the providing of the first portion of the recycled desorbed gas from the lower end of the lower bed of the second stage to the lower end of the lower bed of the first stage, and terminating withdrawing the second portion of the desorbed gas from the lower end of the lower bed of the second stage as waste gas;

(i) equalizing the pressure in the beds of the two adsorption stages;

(j) terminating pressure equalization step (i);

(k) providing pressurized feed gas from the argon containing feed gas stream to the lower end of the upper bed of the second stage; providing pressurized effluent from the upper end of the lower bed of the second stage to the lower end of the upper bed of the second stage; the effluent from the lower bed of the second stage being a first portion of recycled gas from the lower end of the lower bed of the first stage to the lower end of the lower bed of the second stage, and passed through the adsorbent in said lower bed of the second stage whereby at least one or more of oxygen and nitrogen is adsorbed from said recycle gas; and withdrawing a second portion of desorbed gas from the lower end of the lower bed of the first stage as waste gas;

(l) providing pressurized, purified argon product gas from an argon product stream to the upper end of the upper bed of the second stage;

(m) permitting the upper bed of the second stage to reach the desired adsorption pressure then terminating flow of argon product from the product stream to the upper end of the upper bed of the second stage and permitting the adsorbent in the upper bed of the second stage to adsorb one or more of oxygen and nitrogen from the gas in the upper bed of the second stage;

(n) collecting purified argon product gas from effluent from the upper end of the upper bed of the second stage;

(o) providing a portion of the effluent from step (n) as a purge gas to the upper end of the upper bed of the first stage to desorb adsorbed gas(es) from the adsorbent in the upper and lower beds of the first stage and evacuating the desorbed gas from the lower end of the lower bed of the first stage to provide the recycled gas of step (k);

(p) after substantially desorbing all adsorbed gas(es) from the adsorbent in the upper and lower beds of the first stage, terminating the providing of a portion of the effluent in step (o) to the upper end of the upper bed of the first stage;

(q) continue permitting the adsorbent in the upper bed of the second stage to adsorb one or more of oxygen and nitrogen from the gas in the upper bed of the second stage;

(r) when purity of argon the product from the effluent from the upper bed of the second stage is no longer acceptable, terminating collection of the purified argon product, terminating the providing of pressurized feed gas from the argon feed gas stream to the upper bed of the second stage; terminating the providing of the first portion of the recycled gas from the lower end of the lower bed of the first stage to the lower end of the lower bed of the second stage, and terminating withdrawing the second portion of the gas from the lower end of the lower bed of the first stage as waste gas;

(s) equalizing the pressure in the beds of the two adsorption stages; and (t) terminating pressure equalization step (s).

10. A process according to claim 9 wherein the purified argon product comprises about 99.9995% argon or more and the argon recovery is at least about 90%.

11. A process according to claim 10 wherein the pressurized feed gas comprises about 97.5% argon.

12. A process according to claim 9 wherein each bed of the first and second stages each contain oxygen and nitrogen selective adsorbents.

13. A process according to claim 12 wherein the nitrogen selective adsorbent is selected from a type X zeolite and a highly exchanged LiX type zeolite and the oxygen selective adsorbent is selected from CMS and transition metal complexes.

14. The process according to claim 13 wherein the nitrogen selective adsorbent is a highly exchanged LiX zeolite and the oxygen selective adsorbent is the cobalt complex of the dianion of a chelating ligand prepared by the 1:1 condensation of ethoxy-methylene-diethylmalonate and 3,4-diaminopyridine, followed by Schiff base condensation of the remaining primary amine group with 3,5-di-tert-butylsalicylaldehyde.

15. A process according to claim 9 wherein the pressure equalization of step (i) is conducted in a mode of from top end of the upper bed of the first stage to the top end of the upper bed of the second stage, and from bottom end of the bottom bed of the first stage to the bottom end of the bottom bed of the second stage, and the pressure equalization step (s) is conducted in a mode of from the top end of the upper bed of the second stage to the top end of the upper bed of the first stage, and from the bottom end of the bottom bed of the second stage to the bottom end of the bottom bed of the first stage.

16. A duplex pressure swing adsorption system for purifying a first gas from a feed gas stream containing said first gas and impurity gases, the system comprising:

first and second pressure swing adsorption stages for selectively adsorbing/desorbing one or more of the impurity gas(es) from the feed gas stream containing the first gas, each adsorption/desorption stage having an upper bed and a lower bed in fluid communication with each other and each bed of each stage containing adsorbent for one or more of the impurity gases, each bed of each stage having upper and lower ends;

means for providing the feed gas stream;

means for alternatively permitting and prohibiting withdrawal of flow of purified first gas product from each of the two pressure swing adsorption stages;

means for alternatively permitting and prohibiting flow of purified first gas product gas from the beds of one pressure swing adsorption stage to the beds of the other pressure swing adsorption stage to desorb adsorbed gases from the adsorbent in the beds of the other pressure swing adsorption stage; and means for alternatively permitting or prohibiting recycle of a portion of desorbed gases from the beds of one pressure swing adsorption stage to the beds of the other pressure swing adsorption stage.

17. A duplex pressure swing adsorption system according to claim 16 additionally comprising:

means for alternatively permitting or prohibiting feed of the feed gas stream to the beds of the two pressure swing adsorption stages;

means for alternatively permitting and prohibiting withdrawal of flow of purified first gas product from each of the two pressure swing adsorption stages;

means for alternatively permitting and prohibiting flow of purified first gas product gas countercurrently back to each of the two pressure swing adsorption stages;

means for alternatively permitting or prohibiting withdrawal from the system of a portion of the desorbed gases from one of the beds of pressure swing adsorption stages; and means for alternatively permitting or prohibiting pressure equalization between the beds of the two pressure swing adsorption stages.

* * * * *